US012677211B2

(12) United States Patent
Abedini et al.

(10) Patent No.: US 12,677,211 B2
(45) Date of Patent: Jul. 7, 2026

(54) PROVIDING SYSTEM INFORMATION ASSOCIATED WITH NON-ANCHOR CELLS

(71) Applicant: QUALCOMM Incorporated, San Diego, CA (US)

(72) Inventors: Navid Abedini, Basking Ridge, NJ (US); Naeem Akl, Bridgewater, NJ (US); Shankar Krishnan, San Diego, CA (US); Sherif Elazzouni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 169 days.

(21) Appl. No.: 18/465,637

(22) Filed: Sep. 12, 2023

(65) Prior Publication Data

US 2024/0155472 A1 May 9, 2024

Related U.S. Application Data

(60) Provisional application No. 63/382,283, filed on Nov. 3, 2022.

(51) Int. Cl.
H04W 4/00 (2018.01)
H04W 48/16 (2009.01)
(52) U.S. Cl.
CPC ................................... H04W 48/16 (2013.01)
(58) Field of Classification Search
CPC ..... H04W 48/10; H04W 48/16; H04W 48/12; H04W 48/20
See application file for complete search history.

(56) References Cited

U.S. PATENT DOCUMENTS

| 11,665,637 B2 * | 5/2023 | Ingale ................... H04W 72/23 |
| | | 370/450 |
| 2019/0253231 A1 | 8/2019 | Park et al. |
| 2020/0187100 A1 * | 6/2020 | Kim ...................... H04W 48/12 |
| 2020/0260364 A1 * | 8/2020 | Vandervelde ..... H04W 36/0077 |

(Continued)

FOREIGN PATENT DOCUMENTS

| EP | 2695404 B1 | 6/2017 |
| WO | 2018174607 A1 | 9/2018 |

OTHER PUBLICATIONS

Huawei., et al., "Report of [Offline-302] [NES] Cell Selection/ Reselection and SSB/SIB-less (Huawei)", 3GPP TSG RAN WG2 #119bis-e, R2-2210995, 3rd Generation Partnership Project, Mobile Competence Centre, 650, Route Des Lucioles, F-06921 Sophia-Antipolis Cedex, France, vol. RAN WG2, No. Online, Oct. 10, 2022-Oct. 19, 2022, Oct. 21, 2022, 25 Pages, XP052264238, p. 18-p. 23.

(Continued)

*Primary Examiner* — Abdelnabi O Musa
(74) *Attorney, Agent, or Firm* — Harrity & Harrity LLP

(57) ABSTRACT

Various aspects of the present disclosure generally relate to wireless communication. In some aspects, a user equipment (UE) may receive, from a first network node associated with an anchor cell, first system information (SI) associated with the anchor cell and proxy information associated with obtaining second SI. The UE may obtain the second SI based on the proxy information. The UE may communicate with the non-anchor cell based on the second SI. Numerous other aspects are provided.

30 Claims, 9 Drawing Sheets

(56) References Cited

U.S. PATENT DOCUMENTS

| | | | | |
|---|---|---|---|---|
| 2023/0300688 A1* | 9/2023 | Xu | ........................ | H04W 48/18 |
| | | | | 455/436 |
| 2024/0357683 A1* | 10/2024 | Thangarasa | ........... | H04W 76/19 |
| 2025/0097811 A1* | 3/2025 | Yavuz | ................... | H04W 48/10 |
| 2025/0113300 A1* | 4/2025 | Cheng | .............. | H04W 52/0245 |

OTHER PUBLICATIONS

International Search Report and Written Opinion—PCT/US2023/074052—ISA/EPO—Dec. 20, 2023.

Moderator (Apple): "FL Summary #2 on RAN1 Aspects for RAN2-led Features for RedCap", 3GPP TSG-RAN WG1 #108-e, R1-2202589, 3rd Generation Partnership Project, Mobile Competence Centre, 650, Route Des Lucioles, F-06921 Sophia-Antipolis Cedex, France, vol. RAN WG1, No. e-Meeting, Feb. 21, 2022-Mar. 3, 2022, Feb. 23, 2022, 15 Pages, XP052116343, p. 11.

* cited by examiner

610 — Receive, from a first network node associated with an anchor cell, first system information (SI) associated with the anchor cell and proxy information associated with obtaining second SI associated with a non-anchor cell 620 — Obtain the second SI based on the proxy information 630 — Communicate with the non-anchor cell based on the second SI

600

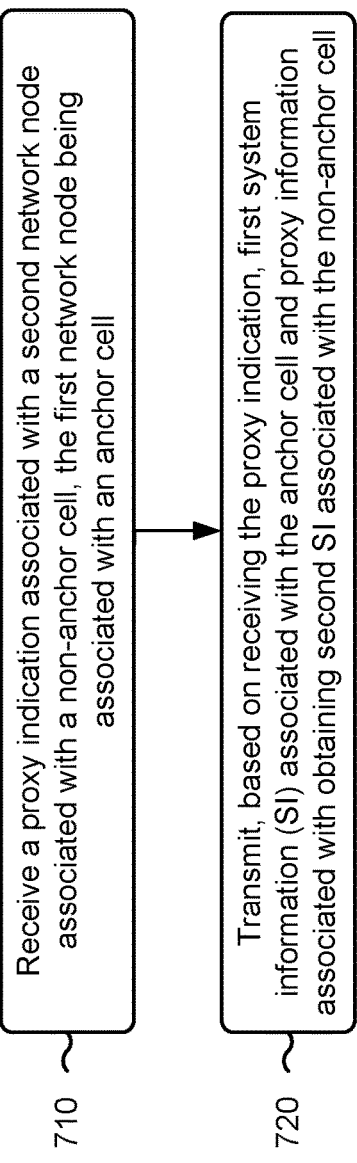

Receive a proxy indication associated with a second network node associated with a non-anchor cell, the first network node being associated with an anchor cell Transmit, based on receiving the proxy indication, first system information (SI) associated with the anchor cell and proxy information associated with obtaining second SI associated with the non-anchor cell

PROVIDING SYSTEM INFORMATION ASSOCIATED WITH NON-ANCHOR CELLS

CROSS-REFERENCE TO RELATED APPLICATION

This Patent Application claims priority to U.S. Provisional Patent Application No. 63/382,283, filed on Nov. 3, 2022, entitled "PROVIDING SYSTEM INFORMATION ASSOCIATED WITH NON-ANCHOR CELLS," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically, to techniques and apparatuses for cell access associated with non-anchor cells.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

In some deployments, an anchor cell (also referred to as an "anchor carrier") can be a cell that provides initial network access to a UE (e.g., in addition to providing data communication), while a non-anchor cell (also referred to as a "non-anchor carrier") can be a cell that does not provide initial network access, but rather only provides data communication. In some cases, an anchor cell can operate in a "normal" non-energy saving mode. In some such deployments, a non-anchor cell can operate in an energy saving mode. Any number of additional anchor cells and/or non-anchor cells can be deployed as well. In some cases, synchronization signal blocks (SSBs) and system information (SI) can be transmitted on an anchor cell but not on a non-anchor cell. The SSBs and SI transmitted on the anchor cell can provide time and frequency synchronization information and SI for the non-anchor cells as well as for the anchor cell. However, in some examples, there can be inadequate management and/or coordination of SI among anchor cells and non-anchor cells, thereby negatively impacting the opportunity for efficient cell access procedures.

SUMMARY

Some aspects described herein relate to a user equipment (UE) for wireless communication. The user equipment may include a processing system that includes processor circuitry and memory circuitry coupled with the processor circuitry. The processing system may be configured to cause the UE to receive, from a first network node associated with an anchor cell, first system information (SI) associated with the anchor cell and proxy information associated with obtaining second SI associated with a non-anchor cell. The at least one processor may be operable to cause the user equipment to obtain the second SI based on the proxy information. The processing system may be configured to cause the UE to communicate with the non-anchor cell based on the second SI.

Some aspects described herein relate to a network node for wireless communication. The network node may include a processing system that includes processor circuitry and memory circuitry coupled with the processor circuitry. The processing system may be configured to cause the network node to receive a proxy indication associated with a second network node associated with a non-anchor cell, the first network node being associated with an anchor cell. The processing system may be configured to cause the network node to transmit, based on receiving the proxy indication, first SI associated with the anchor cell and proxy information associated with obtaining second SI associated with the non-anchor cell.

Some aspects described herein relate to a method of wireless communication performed by an apparatus at a UE. The method may include receiving, from a first network node associated with an anchor cell, first SI associated with the anchor cell and proxy information associated with obtaining second SI associated with a non-anchor cell. The method may include obtaining the second SI based on the proxy information. The method may include communicating with the non-anchor cell based on the second SI.

Some aspects described herein relate to a method of wireless communication performed by an apparatus at a first network node. The method may include receiving a proxy indication associated with a second network node associated with a non-anchor cell, the first network node being associated with an anchor cell. The method may include transmitting, based on receiving the proxy indication, first SI associated with the anchor cell and proxy information associated with obtaining second SI associated with the non-anchor cell.

Some aspects described herein relate to a non-transitory computer-readable medium that stores a set of instructions for wireless communication by a UE. The set of instructions, when executed by one or more processors of the UE, may cause the UE to receive, from a first network node associated with an anchor cell, first SI associated with the anchor cell and proxy information associated with obtaining second SI associated with a non-anchor cell. The set of instructions, when executed by one or more processors of the UE, may cause the UE to obtain the second SI based on the proxy information. The set of instructions, when executed by one or more processors of the UE, may cause the UE to communicate with the non-anchor cell based on the second SI.

Some aspects described herein relate to a non-transitory computer-readable medium that stores a set of instructions for wireless communication by a network node. The set of instructions, when executed by one or more processors of the network node, may cause the network node to receive a proxy indication associated with a second network node associated with a non-anchor cell, the first network node being associated with an anchor cell. The set of instructions, when executed by one or more processors of the network node, may cause the network node to transmit, based on receiving the proxy indication, first SI associated with the anchor cell and proxy information associated with obtaining second SI associated with the non-anchor cell.

Some aspects described herein relate to an apparatus for wireless communication. The apparatus may include means for receiving, from a first network node associated with an anchor cell, first SI associated with the anchor cell and proxy information associated with obtaining second SI associated with a non-anchor cell. The apparatus may include means for obtaining the second SI based on the proxy information. The apparatus may include means for communicating with the non-anchor cell based on the second SI.

Some aspects described herein relate to an apparatus for wireless communication. The apparatus may include means for receiving a proxy indication associated with a network node associated with a non-anchor cell, the apparatus being associated with an anchor cell. The apparatus may include means for transmitting, based on receiving the proxy indication, first SI associated with the anchor cell and proxy information associated with obtaining second SI associated with the non-anchor cell.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 7 is a flowchart illustrating an example process performed, for example, by a network node that supports communications with non-anchor cells in accordance with the present disclosure.

DETAILED DESCRIPTION

Figure 1:
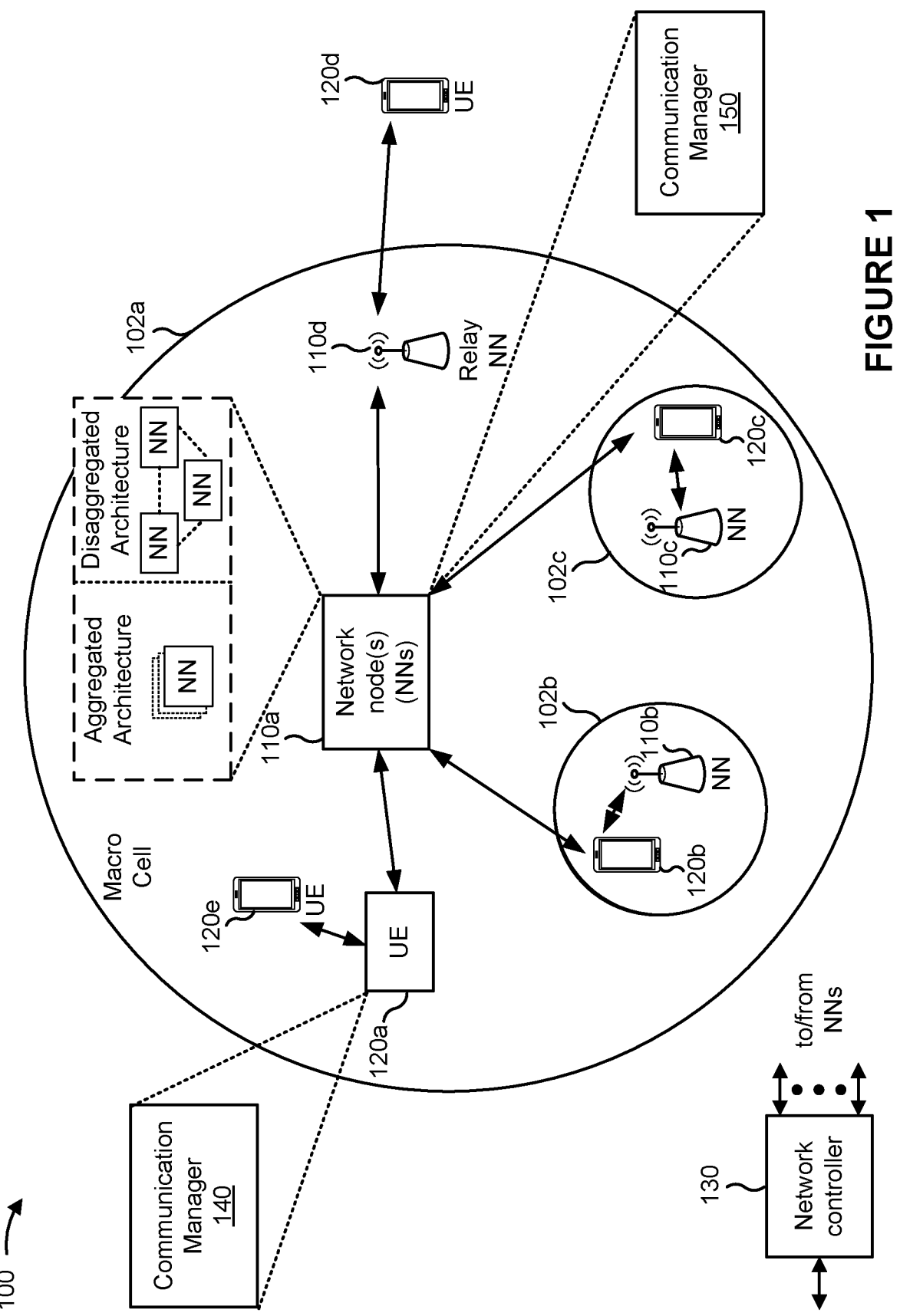
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to providing and obtaining system information (SI) associated with cells operating in an energy saving mode (referred to herein as "non-anchor cells"). Some aspects more specifically relate to a user equipment (UE) receiving, from a network node associated with an anchor cell, proxy information associated with obtaining SI associated with a non-anchor cell. In some aspects, the proxy information may be transmitted in SI associated with the anchor cell. In some aspects, the proxy information may include SI associated with the non-anchor cell and/or may include scheduling information to facilitate obtaining the SI associated with the non-anchor cell. In some aspects, the proxy information may indicate one or more anchor cells from which the UE may obtain the SI associated with the non-anchor cell. In some aspects, the anchor cell and/or the non-anchor cell may provide an SI update associated with the non-anchor cell. In some aspects, the anchor cell and/or the non-anchor cell may provide an indication of an SI update.

Particular aspects of the subject matter described in this disclosure can be implemented to realize one or more of the following potential advantages. In some examples, the described techniques can be used to facilitate providing a UE with information by which the UE may obtain SI associated with a non-anchor cell, which may facilitate a cell access procedure with the non-anchor cell, while allowing the non-anchor cell to operate in an energy saving mode at least prior to the cell access procedure. In some examples, the described techniques can be used to facilitate deployment of non-anchor cells, which can improve secondary cell (Scell) activation efficiency and/or network energy savings.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

A network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant)

modem). In some implementations, one or more processors of the processing system include or implement one or more of the modems. The processing system may further include or be coupled with multiple radios (collectively "the radio"), multiple radio frequency (RF) chains, or multiple transceivers, each of which may in turn be coupled with one or more of multiple antennas. In some implementations, one or more processors of the processing system include or implement one or more of the radios, RF chains or transceivers. The network node 110 may include or may be included in a housing that houses components associated with the network node 110 including the processing system.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the term "base station" or "network node" may refer to one device configured to perform one or more functions, such as those described herein in connection with the network node 110. In some aspects, the term "base station" or "network node"

may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

In some examples, a cell may not necessarily be stationary, and the geographic area of the cell may move in accordance with the location of a network node 110 that is mobile (for example, a mobile network node). In some examples, the network nodes 110 may be interconnected to one another or to one or more other network nodes 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network node) may communicate with the network node 110a (for example, a macro network node) and the UE 120d in order to facilitate communication between the network node 110a and the UE 120d. A network node 110 that relays communications may be referred to as a relay station, a relay network node, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

A UE 120 may include one or more chips, SoCs, chipsets, packages, or devices that individually or collectively constitute or comprise a processing system. The processing system includes processor (or "processing") circuitry in the form of one or multiple processors, microprocessors, processing units (such as CPUs, GPUs, NPUs and/or DSPs), processing blocks, ASIC, PLDs (such as FPGAs), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as RAM or ROM, or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4*a* or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly represent frequencies that may be less than 6 GHz, may be within FR1, or may include mid-band frequencies.

Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a first network node associated with an anchor cell, first SI associated with the anchor cell and proxy information associated with obtaining second SI associated with a non-anchor cell; obtain the second SI based on the proxy information; and communicate with the non-anchor cell based on the second SI. Additionally, or alternatively, the communication manager 140 may perform one or more other operations described herein.

In some aspects, the network node 110 may include a communication manager 150. As described in more detail elsewhere herein, the communication manager 150 may receive a proxy indication associated with a second network node associated with a non-anchor cell, the first network node being associated with an anchor cell; and transmit, based on receiving the proxy indication, first SI associated with the anchor cell and proxy information associated with obtaining second SI associated with the non-anchor cell. Additionally, or alternatively, the communication manager 150 may perform one or more other operations described herein.

Figure 2:
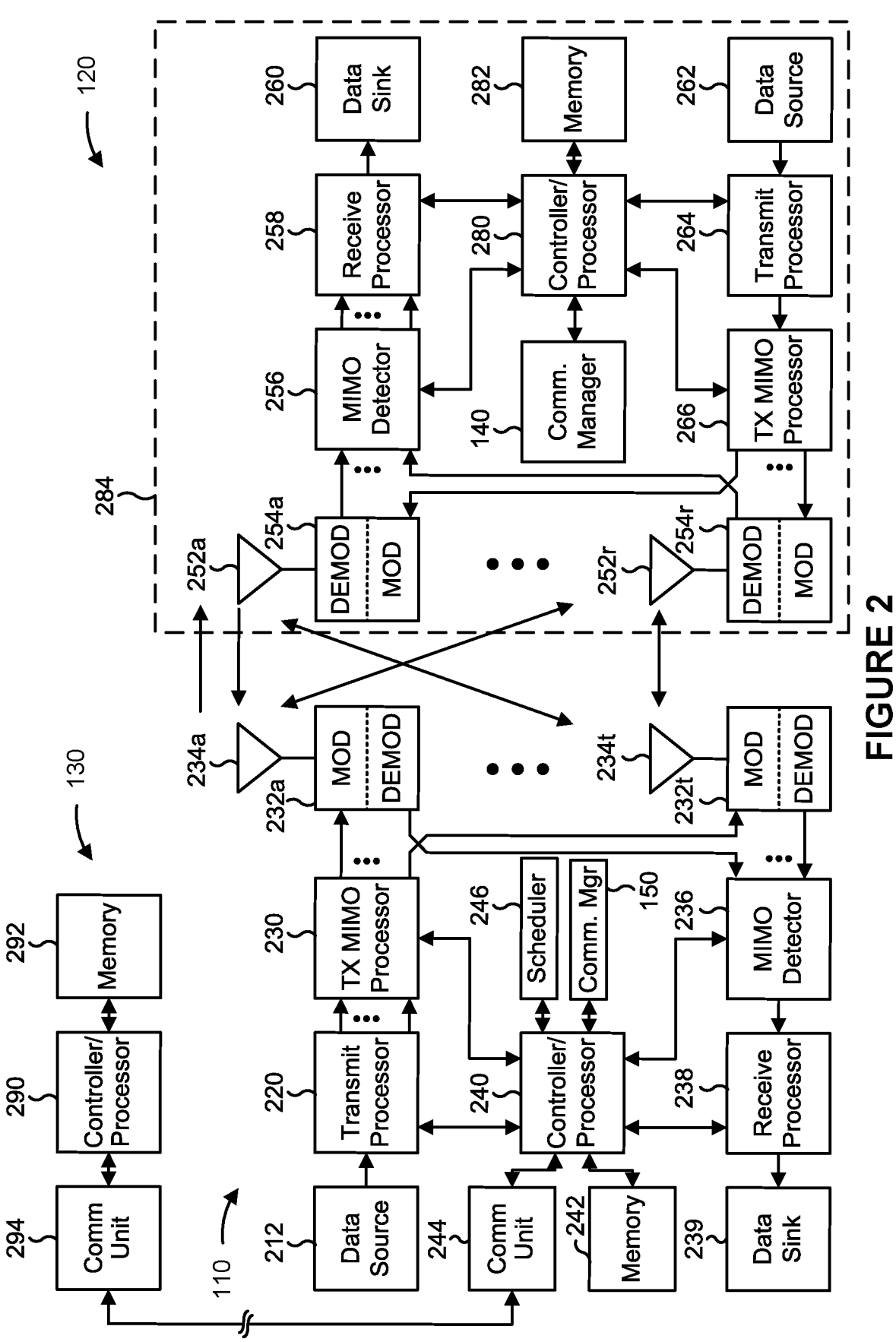
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers and/or one or more processors. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with system information associated with non-anchor cells, as described in more detail elsewhere herein. For example, the controller/processor 240 of the network node 110, the controller/processor 280 of the UE 120, or any other component(s) of FIG. 2 may perform or direct operations of, for example, process 600 of FIG. 6, process 700 of FIG. 7, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example process 600 of FIG. 6, process 700 of FIG. 7, or other processes as described herein. In some examples, executing instructions may include running the instructions, converting the instructions, compiling the instructions, or interpreting the instructions, among other examples.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 220, TX MIMO processor 230, MIMO detector 236, receive processor 238, and/or controller/processor 240. Similarly, one or more processors of the UE 220 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

In some aspects, a UE (e.g., the UE 120) includes means for receiving, from a first network node associated with an anchor cell, first SI associated with the anchor cell and proxy information associated with obtaining second SI associated with a non-anchor cell; means for obtaining the second SI based on the proxy information; and/or means for communicating with the non-anchor cell based on the second SI. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for receiving a proxy indication associated with a second network node associated with a non-anchor cell, the first network node being associated with an anchor cell; and/or means for transmitting, based on receiving the proxy indication, first SI associated with the anchor cell and proxy information associated with obtaining second SI associated with the non-anchor cell. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, and/or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
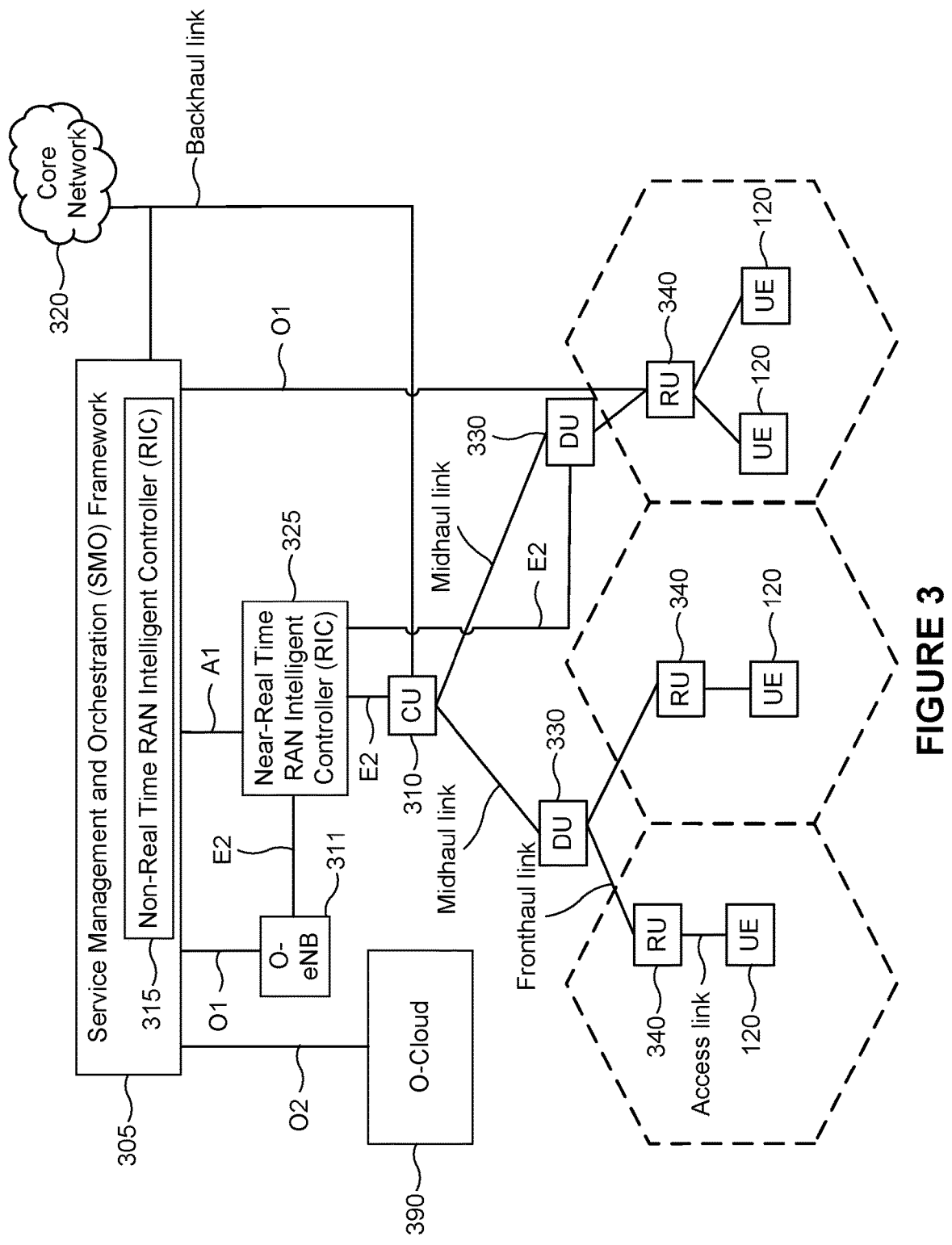
FIG. 3 is a diagram illustrating an example disaggregated base station architecture in accordance with the present disclosure.

FIG. 3 is a diagram illustrating an example disaggregated base station architecture 300 in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective RF access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), and/or control plane functionality (for example, Central Unit—Control Plane (CU-CP) functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

Figure 4:
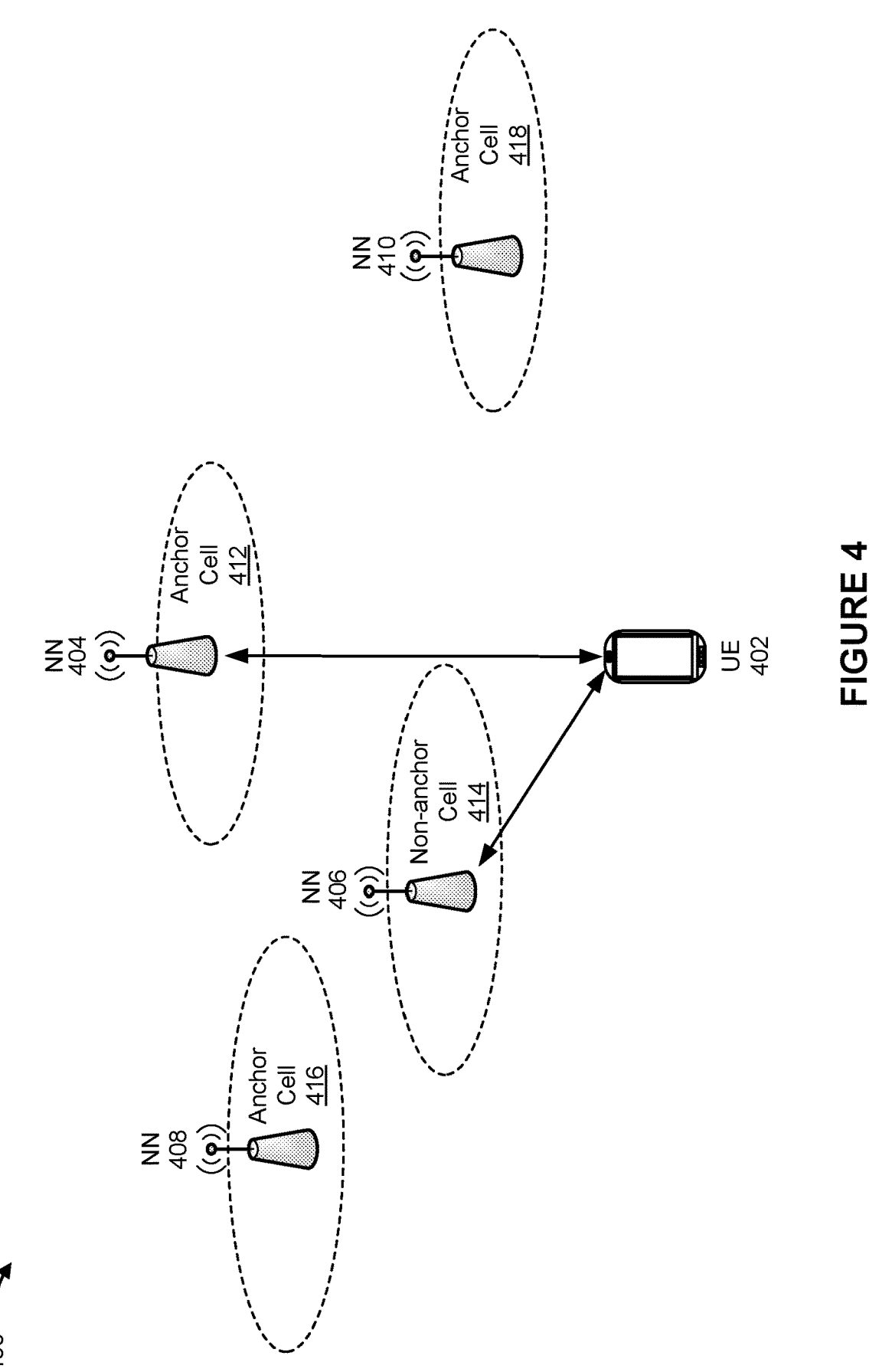
FIG. 4 is a diagram illustrating an example associated with network access and communications associated with anchor cells and non-anchor cells in accordance with the present disclosure.

FIG. 4 is a diagram illustrating an example 400 associated with network access and communications associated with anchor cells and non-anchor cells in accordance with the present disclosure. Example 400 illustrates a UE 402 that can communicate with one or more network nodes ("NN") 404, 406, 408, and 410. In some aspects, the UE 402 can be, be similar to, include, or be included in, the UE 120 described in connection with FIGS. 1-3. In some aspects, the network node 404, 406, 408, and/or 410 can be, be similar to, include, or be included in, the network node 110 described in connection with FIGS. 1 and 2 and/or one or more components of the disaggregated base station architecture 300 described in connection with FIG. 3.

As shown, the network node 404 can be associated with an anchor cell 412 and the network node 406 can be associated with a non-anchor cell 414. In some aspects, an anchor cell (also referred to as an "anchor carrier") can be a cell that provides initial network access to a UE (e.g., in addition to providing data communication), while a non-anchor cell (also referred to as a "non-anchor carrier") can be a cell that does not provide initial network access, but rather only provides data communication. For example, the network node 404 associated with the anchor cell 412 can provide a cell access procedure and/or can transmit SI including, for example, minimum system information (MSI) (e.g., a master information block (MIB) and/or a synchronization signal block (SSB)), remaining system information (RMSI) (e.g., a system information block 1 (SIB1)), and/or other SI (OSI), among other examples. In some aspects, the network node 404 can transmit paging messages and/or other short messages, among other examples.

In contrast, the network node 406 associated with the non-anchor cell 414 can be operable to not provide a cell access procedure, to deactivate one or more components of the network node 406, and/or to refrain from performing one or more operations that a network node associated with an anchor cell can perform. In some cases, a cell can be configured as an anchor cell or a non-anchor cell. For example, a cell can be a non-anchor cell based on the associated network node operating, at least in connection with the non-anchor cell, in an energy saving mode. For example, in an energy saving mode, the network node 406 can deactivate one or more antenna panels, receive chains, and/or transmit chains, among other examples. In some examples, in the energy saving mode, the network node 406 can refrain from transmitting one or more types of SI (e.g., MIB, SSB, SIB1, and/or OSI, among other examples), paging messages, and/or short messages, among other examples. An example of a non-anchor cell is an SSB-less cell. An SSB-less cell is a cell that does not transmit SSBs. For example, the network node 406 can refrain from transmitting any broadcast transmissions (e.g., SSBs, SI, and/or paging messages) on an SSB-less carrier. In some examples, the anchor cell 412 can be a primary cell (Pcell) and the non-anchor cell 414 can be a secondary cell (SCell).

In some aspects, any number of additional anchor cells and/or non-anchor cells can be deployed. As shown, for example, the network node 408 can be associated with an anchor cell 416 and the network node 410 can be associated with an anchor cell 418. In some aspects, any number of the network nodes 404, 406, 408, and 410 can be associated with multiple anchor cells and/or non-anchor cells. For example, in some cases, two or more of the network nodes 404, 406, 408, and 410 can be co-located (e.g., as components of a base station and/or a DU, and/or the like), in which case, two or more of the cells 412, 414, 416, and 418 can be aggregated using carrier aggregation.

In some aspects, the network node 404 can transmit SSBs and SI on the anchor cell 412, while the network node 406 does not transmit SSBs and SI on the non-anchor cell 414. The SSBs and SI transmitted on the anchor cell 412 can provide time and frequency synchronization information and SI for the non-anchor cell 414 (and/or any number of additional non-anchor cells), as well as for the anchor cell 412. In some cases, transmitting SSBs on the anchor cell 412

(e.g., the Pcell), but not on non-anchor cells (e.g., the Scells) can improve Scell activation latency (e.g., because the UE 402 does not receive a respective SSB on each Scell). Such improved Scell activation latency can facilitate efficient Scell activation and/or deactivation in accordance with the actual traffic associated with a UE 402, which can result in network power savings. Furthermore, not transmitting SSBs and/or SI on the non-anchor cells (e.g., the Scells) can result in improved resource utilization by reducing downlink overhead. This can allow for deeper network sleep for improved power savings. However, in some example, there can be inadequate management and/or coordination of SI among anchor cells and non-anchor cells, thereby negatively impacting the opportunity for efficient cell access procedures.

Various aspects relate generally to providing SI associated with non-anchor cells. Some aspects more specifically relate to a UE receiving, from a network node associated with an anchor cell, proxy information associated with obtaining SI associated with a non-anchor cell. In some aspects, the proxy information may be transmitted in SI associated with the anchor cell. In some aspects, the proxy information may include SI associated with the non-anchor cell and/or may include scheduling information to facilitate obtaining the SI associated with the non-anchor cell. In some aspects, the proxy information may indicate one or more anchor cells from which the UE may obtain the SI associated with the non-anchor cell. In some aspects, the anchor cell and/or the non-anchor cell may provide an SI update associated with the non-anchor cell. In some aspects, the anchor cell and/or the non-anchor cell may provide an indication of an SI update.

Particular aspects of the subject matter described in this disclosure can be implemented to realize one or more of the following potential advantages. In some examples, the described techniques can be used to facilitate providing a UE with information by which the UE may obtain SI associated with a non-anchor cell, which may facilitate a cell access procedure with the non-anchor cell, while allowing the non-anchor cell to operate in an energy saving mode at least prior to the cell access procedure. In some examples, the described techniques can be used to facilitate deployment of non-anchor cells, which can improve Scell activation efficiency and/or network energy savings.

Figure 5:
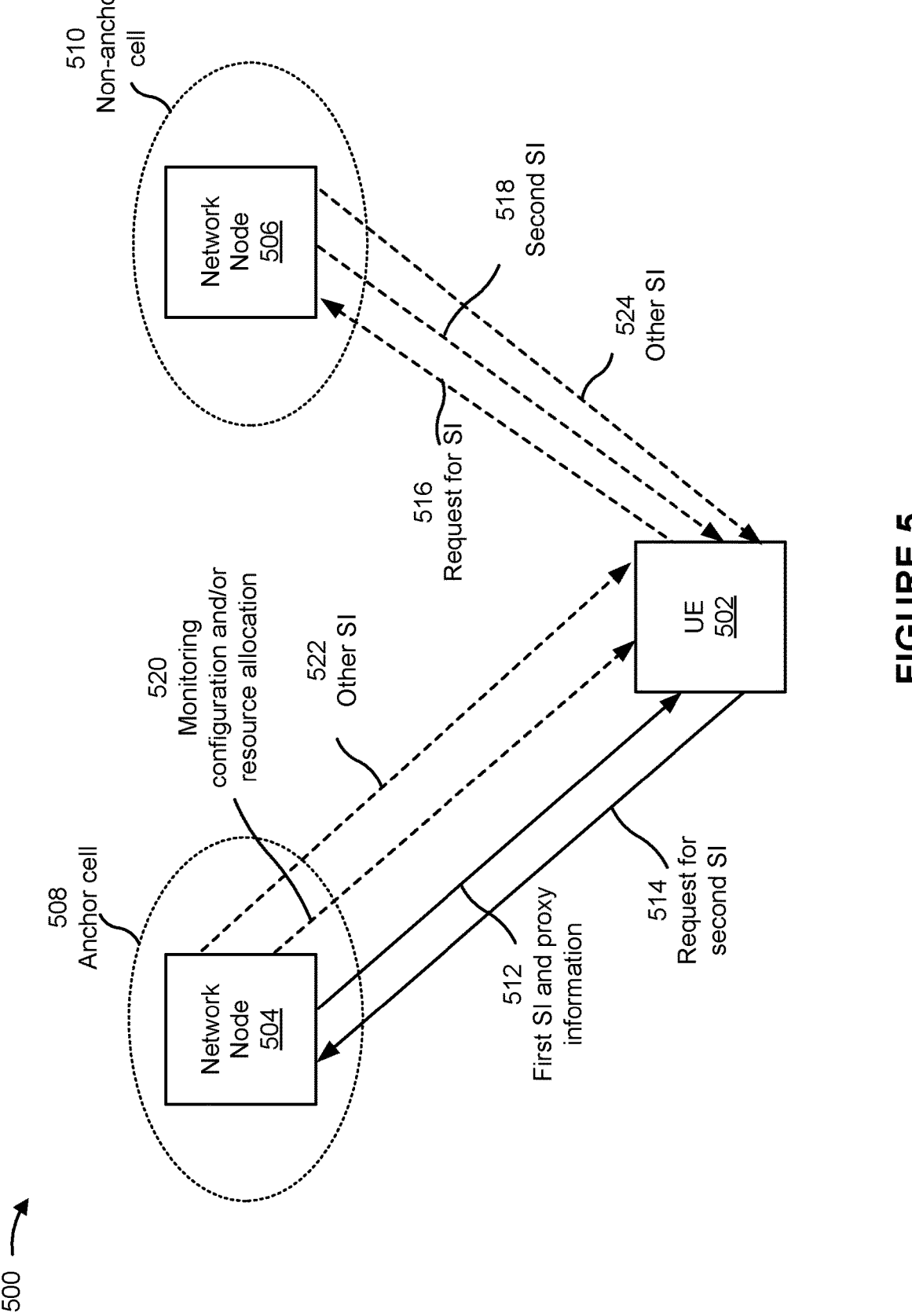
FIG. 5 is a diagram illustrating an example associated with obtaining, based on proxy information provided by anchor cells, system information (SI) associated with non-anchor cells in accordance with the present disclosure.

FIG. 5 is a diagram illustrating an example 500 associated with obtaining, based on proxy information provided by anchor cells, SI associated with non-anchor cells in accordance with the present disclosure. As shown in FIG. 5, a UE 502 may communicate with a network node 504 and a network node 506. In some aspects, the UE 502 may be, be similar to, include, or be included in, the UE 402 depicted in FIG. 4 and/or the UE 120 depicted in FIGS. 1-3. In some aspects, the network node 504 may be associated with an anchor cell 508 and the network node 506 may be associated with a non-anchor cell 510. In some aspects, the network node 504 may be, be similar to, include, or be included in, the network node 404, 408 and/or 410 depicted in FIG. 4, the network node 110 depicted in FIGS. 1 and 2, and/or one or more components of the disaggregated base station architecture depicted in FIG. 3. In some aspects, the network node 506 may be, be similar to, include, or be included in, the network node 406 depicted in FIG. 4, the network node 110 depicted in FIGS. 1 and 2, and/or one or more components of the disaggregated base station architecture depicted in FIG. 3.

In a first operation 512, the network node 504 may transmit, and the UE 502 may receive, first SI associated with the anchor cell 508 and proxy information associated with obtaining second SI associated with the non-anchor cell 510. non-anchor cellIn some aspects, the first SI may include a first SIB1. The first SIB1 may include scheduling information associated with a second SIB1 associated with the non-anchor cell 510. The first SIB1 may include an SI type indication that indicates that the first SIB1 is to be used as the second SIB1. In some aspects, the SIB1 of the non-anchor cell 510 may be provided in a similar manner as other SI on the anchor cell 508. In some aspects, the SIB1 associated with the anchor cell 508 may include "SI-SchedulingInfo" to provide information (such a periodicity) needed to acquire the SIB1 associated with the non-anchor cell 510.

In some aspects, the SIB1 may indicate a cell ID associated with non-anchor cell 510. The first SIB1 may indicate any number of other cell IDs and/or area IDs for which the first SIB1 provides proxy information. In some aspects, the first SIB1 may include scheduling information that indicates the cell ID. In some aspects, the first SIB1 may include an SI type indication that indicates the cell ID. The SIB1 may indicate an area ID associated with an area associated with the non-anchor cell 510. For example, a "systemInformationAreaID" (or a dedicated information element (IE) such as "systemInformationAreaID_SIB1" or "systemInformationAreaID_nonAcnhor") may be indicated as being associated with the provided SIB1. In some examples, the area ID may not represent the anchor cell 508 itself. The area ID may be associated with one or more associated SIB1*s*. In some aspects, the first SIB1 may include a second SIB1 associated with the non-anchor cell 510. In some aspects, the proxy information may include an indication of a difference between the first SIB1 and a second SIB1 associated with the non-anchor cell 510.

In some aspects, the second SI may include on-demand SI. In an operation 514, the UE 502 may transmit, and the network node 504 may receive, a request for the second SI. In some aspects, the UE 502 may transmit the request for the second SI based on transmitting a random access channel (RACH) message that indicates a request for the second SI. In some aspects, the proxy information may indicate at least one of a request configuration associated with a request for on-demand SI associated with the non-anchor cell 510 or a resource allocation associated with the request, and the UE 502 may transmit the request. In some aspects, the UE 502 may transmit the request based on transmitting a RACH message that indicates the request. In an operation 516, the UE 502 may transmit, and the network node 506 may receive, the request for other SI.

In an operation 518, the network node 506 may transmit, and the UE 502 may receive, the second SI. The network node 506 may transmit the second SI based on the proxy information, where the second SI is on-demand SI. In an operation 520, the network node 504 may transmit, and the UE 502 may receive, at least one of a monitoring configuration or a resource allocation. The UE 502 may receive the on-demand SI based on the at least one of the monitoring configuration or the resource allocation.

In some aspects, the proxy information may indicate at least one of a configuration associated with a second SIB1 associated with the non-anchor cell 510 or a resource allocation associated with the second SIB1. In some aspects, the UE 502 may obtain the second SI based on the at least one of the configuration associated with the second SIB1 or the resource allocation associated with the second SIB1. In some aspects, the UE 502 may receive the proxy information based on receiving a first SIB1 associated with the anchor cell 508. The first SIB1 may indicate the proxy information. In some aspects, receiving the proxy information may include receiving a dedicated SI transmission from the first network node 504. In some aspects, receiving the proxy information may include receiving an RRC message from the network node 504.

In some aspects, at least one of the first SI or the second SI may indicate scheduling information associated with other SI associated with the non-anchor cell 510. In an operation 522, the network node 504 may transmit, and the UE 502 may receive, the other SI. In an operation 524, the network node 506 may transmit, and the UE 502 may receive, the other SI. In some aspects, the other SI may include on-demand SI. In some aspects, the first SI may indicate scheduling information associated with the other SI. In some aspects, the scheduling information may indicate a cell, of the anchor cell 508 and the non-anchor cell 510, on which a request for the other SI is to be transmitted.

In some aspects, at least one of the first SI or the second SI may indicate an area ID associated with the non-anchor cell 510, and the UE 502 may obtain other SI associated with the non-anchor cell 510 based on the area ID. In some aspects, the first SI may indicate a SIB1 associated with the non-anchor cell 510, and the first SI may indicate whether the non-anchor cell 510 is associated with an area ID associated with the anchor cell 508. In some aspects, the UE 502 may obtain the second SI based on receiving, from the network node 506, a SIB1 associated with the non-anchor cell 510. The SIB1 may indicate an additional network node associated with an additional cell associated with an area ID, where the area ID is associated with the network node 506. In some aspects, the area ID may be associated with other SI associated with the non-anchor cell 510.

In some aspects, the UE 502 may obtain the second SI based on receiving, from the network node 506, a SIB1 associated with the non-anchor cell 510. The SIB1 may indicate an additional network node associated with an additional cell associated with other SI, where the other SI is associated with the non-anchor cell 510. In some aspects, the other SI may be common to the non-anchor cell 510 and the additional cell.

In some aspects, the UE 502 may monitor, on the non-anchor cell 510, for an SI update indication. The UE 502 may receive the SI update indication and obtain, from the network node 504 and based on receiving SI update indication, updated SI associated with the non-anchor cell 510. In some aspects, the UE 502 may monitor on at least one of the anchor cell 508 or the non-anchor cell 510. In some aspects, the UE 502 may monitor, on the anchor cell 508 or the non-anchor cell 510, for a paging message. In some aspects, the UE 502 may monitor, on the anchor cell 508, for an SI update indication associated with the non-anchor cell 510.

In some aspects, the network node 504 may transmit a short message that includes the SI update indication and the UE 502 may obtain, based on receiving the short message, a first SIB1 associated with the anchor cell 508. The first SIB1 may indicate a change in a second SIB1 associated with the non-anchor cell 510. In some aspects, the UE 502 may receive a non-anchor cell indication that indicates at least one of an SI update change associated with at least one non-anchor cell, a cell ID associated with the at least one non-anchor cell, or an area ID associated with the at least one non-anchor cell.

In some aspects, the UE 502 may receive the non-anchor cell indication based on receiving a short message including the non-anchor cell indication. In some aspects, the UE 502 may monitor for the non-anchor cell indication. In some aspects, the UE 502 may receive the non-anchor cell indication based on receiving a physical downlink shared channel (PDSCH) communication including the non-anchor cell indication. In some aspects, the UE 502 may receive the non-anchor cell indication based on receiving a permanent equipment identifier (PEI) including the non-anchor cell indication.

In some aspects, the second SI may be associated with an SI-specific area ID. In some aspects, the UE 502 may receive a communication that includes an indication of at least one neighbor cell ID associated with an area ID, where the area ID is associated with the anchor cell 508. In some aspects, the communication may include at least one of a SIB1, other SI, or an RRC message.

In some aspects, the UE 502 may receive a physical broadcast channel (PBCH) communication that includes cell information indicative of the anchor cell 508 and the UE 502 may monitor for the first SI based on the PBCH communication. In some aspects, the cell information may indicate one or more frequency resources associated with the anchor cell 508. The cell information may indicate a cell ID associated with the anchor cell 508 and/or an area ID associated with the anchor cell 508.

Figure 6:
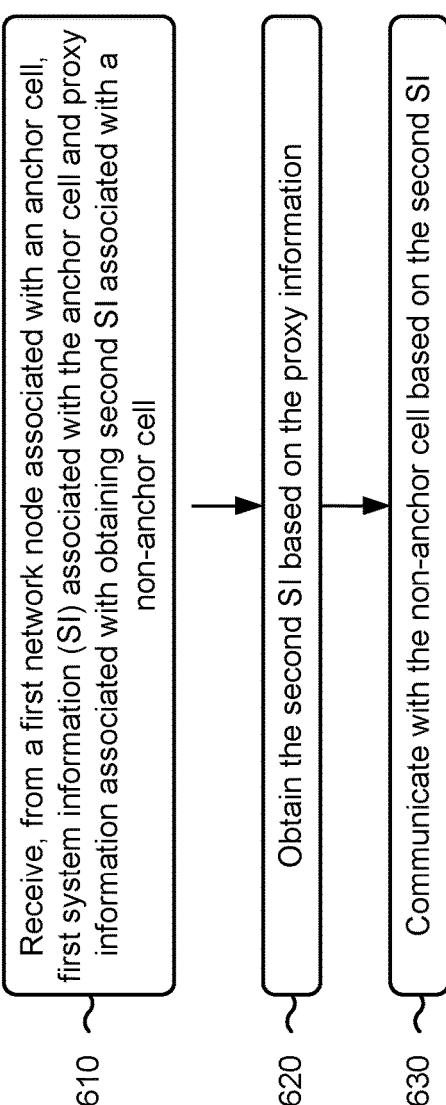
FIG. 6 is a flowchart illustrating an example process performed, for example, by a UE that supports communications with non-anchor cells in accordance with the present disclosure.

FIG. 6 is a flowchart illustrating an example process 600 performed, for example, by a UE that supports communications with non-anchor cells in accordance with the present disclosure. Example process 600 is an example where the UE (for example, UE 502) performs operations associated with SI associated with cells operating in an energy saving mode.

As shown in FIG. 6, in some aspects, process 600 may include receiving, from a first network node associated with an anchor cell, first SI associated with the anchor cell and proxy information associated with obtaining second SI associated with a non-anchor cell (block 610). For example, the UE (such as by using communication manager 808 or reception component 802, depicted in FIG. 8) may receive, from a first network node associated with an anchor cell, first SI associated with the anchor cell and proxy information associated with obtaining second SI associated with a non-anchor cell that is associated with an energy saving mode of operation, as described above.

As further shown in FIG. 6, in some aspects, process 600 may include obtaining the second SI based on the proxy information (block 620). For example, the UE (such as by using communication manager 808 or reception component 802, depicted in FIG. 8) may obtain the second SI based on the proxy information, as described above.

As further shown in FIG. 6, in some aspects, process 600 may include communicating with the non-anchor cell based on the second SI (block 630). For example, the UE (such as by using communication manager 808, reception component 802, or transmission component 804, depicted in FIG. 8) may communicate with the non-anchor cell based on the second SI, as described above.

Process 600 may include additional aspects, such as any single aspect or any combination of aspects described below or in connection with one or more other processes described elsewhere herein.

In a first additional aspect, the first SI comprises a first SIB1. In a second additional aspect, alone or in combination with the first aspect, the first SIB1 includes scheduling information associated with a second SIB1 associated with the non-anchor cell. In a third additional aspect, alone or in combination with one or more of the first and second aspects, the first SIB1 includes an SI type indication that indicates that the first SIB1 is to be used as the second SIB1. In a fourth additional aspect, alone or in combination with one or more of the first through third aspects, the SIB1 indicates a cell ID associated with the non-anchor cell. In a fifth additional aspect, alone or in combination with one or more of the first through fourth aspects, the first SIB1 includes scheduling information that indicates the cell ID. In a sixth additional aspect, alone or in combination with one or more of the first through fifth aspects, the first SIB1 includes an SI type indication that indicates the cell ID.

In a seventh additional aspect, alone or in combination with one or more of the first through sixth aspects, the SIB1 indicates an area ID associated with an area associated with the non-anchor cell. In an eighth additional aspect, alone or in combination with one or more of the first through seventh aspects, the first SIB1 includes a second SIB1 associated with the non-anchor cell. In a ninth additional aspect, alone or in combination with one or more of the first through eighth aspects, the proxy information comprises an indication of a difference between the first SIB1 and a second SIB1 associated with the non-anchor cell.

In a tenth additional aspect, alone or in combination with one or more of the first through ninth aspects, the second SI comprises on-demand SI, process 600 includes transmitting, to the first network node, a request for the second SI. In an eleventh additional aspect, alone or in combination with one or more of the first through tenth aspects, transmitting the request for the second SI comprises transmitting a RACH message that indicates a request for the second SI. In a twelfth additional aspect, alone or in combination with one or more of the first through eleventh aspects, the proxy information indicates at least one of a request configuration associated with a request for on-demand SI associated with the non-anchor cell or a resource allocation associated with the request, process 600 includes transmitting the request. In a thirteenth additional aspect, alone or in combination with one or more of the first through twelfth aspects, transmitting the request comprises transmitting a RACH message that indicates the request.

In a fourteenth additional aspect, alone or in combination with one or more of the first through thirteenth aspects, transmitting the request comprises transmitting the request to the anchor cell. In a fifteenth additional aspect, alone or in combination with one or more of the first through fourteenth aspects, transmitting the request comprises transmitting the request to the non-anchor cell. In a sixteenth additional aspect, alone or in combination with one or more of the first through fifteenth aspects, obtaining the second SI based on the proxy information comprises receiving, from the non-anchor cell and based on the request, the on-demand SI. In a seventeenth additional aspect, alone or in combination with one or more of the first through sixteenth aspects, process 600 includes receiving, from the first network node, at least one of a monitoring configuration or a resource allocation, wherein receiving the on-demand SI comprises receiving the on-demand SI based on the at least one of the monitoring configuration or the resource allocation.

In an eighteenth additional aspect, alone or in combination with one or more of the first through seventeenth aspects, the proxy information indicates at least one of a configuration associated with a second SIB1 associated with the non-anchor cell or a resource allocation associated with the second SIB1, wherein obtaining the second SI comprises receiving the second SIB1 based on the at least one of the configuration associated with the second SIB1 or the resource allocation associated with the second SIB1. In a nineteenth additional aspect, alone or in combination with one or more of the first through eighteenth aspects, receiving the proxy information comprises receiving a first SIB1 associated with the anchor cell, the first SIB1 indicating the proxy information. In a twentieth additional aspect, alone or in combination with one or more of the first through nineteenth aspects, receiving the proxy information comprises receiving a dedicated SI transmission from the first network node. In a twenty-first additional aspect, alone or in combination with one or more of the first through twentieth aspects, receiving the proxy information comprises receiving an RRC message from the first network node.

In a twenty-second additional aspect, alone or in combination with one or more of the first through twenty-first aspects, at least one of the first SI or the second SI indicates scheduling information associated with other SI associated with the non-anchor cell. In a twenty-third additional aspect, alone or in combination with one or more of the first through twenty-second aspects, process 600 includes receiving the other SI. In a twenty-fourth additional aspect, alone or in combination with one or more of the first through twenty-third aspects, receiving the other SI comprises receiving the other SI from the first network node. In a twenty-fifth additional aspect, alone or in combination with one or more of the first through twenty-fourth aspects, receiving the other SI comprises receiving the other SI from a second network node associated with the non-anchor cell. In a twenty-sixth additional aspect, alone or in combination with one or more of the first through twenty-fifth aspects, the other SI comprises on-demand SI. In a twenty-seventh additional aspect, alone or in combination with one or more of the first through twenty-sixth aspects, the first SI indicates scheduling information associated with the other SI. In a twenty-eighth additional aspect, alone or in combination with one or more of the first through twenty-seventh aspects, the scheduling information indicates a cell, of the anchor cell and the non-anchor cell, on which a request for the other SI is to be transmitted.

In a twenty-ninth additional aspect, alone or in combination with one or more of the first through twenty-eighth aspects, at least one of the first SI or the second SI indicates an area ID associated with the non-anchor cell, process 600 includes obtaining other SI associated with the non-anchor cell based on the area ID. In a thirtieth additional aspect, alone or in combination with one or more of the first through twenty-ninth aspects, the first SI indicates a SIB1 associated with the non-anchor cell, and the first SI indicates whether the non-anchor cell is associated with an area ID associated with the anchor cell. In a thirty-first additional aspect, alone or in combination with one or more of the first through thirtieth aspects, obtaining the second SI comprises receiving, from a second network node associated with the non-anchor cell, a SIB1 associated with the non-anchor cell, wherein the SIB1 indicates an additional network node associated with an additional cell associated with an area ID, wherein the area ID is associated with the second network node. In a thirty-second additional aspect, alone or in combination with one or more of the first through thirty-first aspects, the area ID is associated with other SI associated with the non-anchor cell.

In a thirty-third additional aspect, alone or in combination with one or more of the first through thirty-second aspects, obtaining the second SI comprises receiving, from a second network node associated with the non-anchor cell, a SIB1 associated with the non-anchor cell, wherein the SIB1 indicates an additional network node associated with an additional cell associated with other SI, wherein the other SI is associated with the non-anchor cell. In a thirty-fourth additional aspect, alone or in combination with one or more of the first through thirty-third aspects, the other SI is common to the non-anchor cell and the additional cell.

In a thirty-fifth additional aspect, alone or in combination with one or more of the first through thirty-fourth aspects, process 600 includes monitoring, on the non-anchor cell, for an SI update indication. In a thirty-sixth additional aspect, alone or in combination with one or more of the first through thirty-fifth aspects, process 600 includes receiving the SI update indication, and obtaining, from the first network node and based on receiving SI update indication, updated SI associated with the non-anchor cell. In a thirty-seventh additional aspect, alone or in combination with one or more of the first through thirty-sixth aspects, process 600 includes monitoring, on at least one of the anchor cell or the non-anchor cell, for a paging message. In a thirty-eighth additional aspect, alone or in combination with one or more of the first through thirty-seventh aspects, process 600 includes monitoring, on the anchor cell, for an SI update indication associated with the non-anchor cell. In a thirty-ninth additional aspect, alone or in combination with one or more of the first through thirty-eighth aspects, process 600 includes receiving, from the first network node, a short message comprising the SI update indication, and obtaining, based on receiving the short message, a first SIB1 associated with the anchor cell, wherein the first SIB1 indicates a change in a second SIB1 associated with the non-anchor cell. In a fortieth additional aspect, alone or in combination with one or more of the first through thirty-ninth aspects, process 600 includes receiving a non-anchor cell indication that indicates at least one of an SI update change associated with at least one non-anchor cell, a cell ID associated with the at least one non-anchor cell, or an area ID associated with the at least one non-anchor cell. In a forty-first additional aspect, alone or in combination with one or more of the first through fortieth aspects, receiving the non-anchor cell indication comprises receiving a short message including the non-anchor cell indication.

In a forty-second additional aspect, alone or in combination with one or more of the first through forty-first aspects, process 600 includes monitoring for the non-anchor cell indication. In a forty-third additional aspect, alone or in combination with one or more of the first through forty-second aspects, receiving the non-anchor cell indication comprises receiving a PDSCH communication including the non-anchor cell indication. In a forty-fourth additional aspect, alone or in combination with one or more of the first through forty-third aspects, receiving the non-anchor cell indication comprises receiving a permanent equipment identifier including the non-anchor cell indication.

In a forty-fifth additional aspect, alone or in combination with one or more of the first through forty-fourth aspects, the second SI is associated with an SI-specific area identifier. In a forty-sixth additional aspect, alone or in combination with one or more of the first through forty-fifth aspects, process 600 includes receiving a communication comprising an indication of at least one neighbor cell ID associated with an area ID, wherein the area ID is associated with the anchor cell. In a forty-seventh additional aspect, alone or in combination with one or more of the first through forty-sixth aspects, the communication comprises at least one of a SIB1, other SI, or an RRC message. In a forty-eighth additional aspect, alone or in combination with one or more of the first through forty-seventh aspects, process 600 includes receiving a PBCH communication comprising cell information indicative of the anchor cell, and monitoring for the first SI based on the PBCH communication.

In a forty-ninth additional aspect, alone or in combination with one or more of the first through forty-eighth aspects, the cell information indicates one or more frequency resources associated with the anchor cell. In a fiftieth additional aspect, alone or in combination with one or more of the first through forty-ninth aspects, the cell information indicates a cell ID associated with the anchor cell. In a fifty-first additional aspect, alone or in combination with one or more of the first through fiftieth aspects, the cell information indicates an area ID associated with the anchor cell.

In a fifty-second additional aspect, alone or in combination with one or more of the first through fiftieth aspects, the non-anchor cell is associated with an energy saving mode of operation.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

FIG. 7 is a flowchart illustrating an example process 700 performed, for example, by a network node that supports communications with non-anchor cells in accordance with the present disclosure. Example process 700 is an example where the network node (for example, network node 110) performs operations associated with SI associated with cells operating in an energy saving mode.

As shown in FIG. 7, in some aspects, process 700 may include receiving a proxy indication associated with a second network node associated with a non-anchor cell that is associated with an energy saving mode of operation, the first network node being associated with an anchor cell (block 710). For example, the network node (such as by using communication manager 908 or reception component 902, depicted in FIG. 9) may receive a proxy indication associated with a second network node associated with a non-anchor cell that is associated with an energy saving mode of operation, the first network node being associated with an anchor cell, as described above.

As further shown in FIG. 7, in some aspects, process 700 may include transmitting, based on receiving the proxy indication, first SI associated with the anchor cell and proxy information associated with obtaining second SI associated with the non-anchor cell (block 720). For example, the network node (such as by using communication manager 908 or transmission component 904, depicted in FIG. 9) may transmit, based on receiving the proxy indication, first SI associated with the anchor cell and proxy information associated with obtaining second SI associated with the non-anchor cell, as described above.

Process 700 may include additional aspects, such as any single aspect or any combination of aspects described below or in connection with one or more other processes described elsewhere herein.

In a first additional aspect, the first SI comprises a first SIB1. In a second additional aspect, alone or in combination with the first aspect, the first SIB1 includes scheduling information associated with a second SIB1 associated with the non-anchor cell. In a third additional aspect, alone or in combination with one or more of the first and second aspects, the first SIB1 includes an SI type indication that indicates that the first SIB1 is to be used as the second SIB1. In a fourth additional aspect, alone or in combination with one or more of the first through third aspects, the SIB1 indicates a cell ID associated with the non-anchor cell. In a fifth additional aspect, alone or in combination with one or more of the first through fourth aspects, the first SIB1 includes scheduling information that indicates the cell ID. In a sixth additional aspect, alone or in combination with one or more of the first through fifth aspects, the first SIB1 includes an SI type indication that indicates the cell ID. In a seventh additional aspect, alone or in combination with one or more of the first through sixth aspects, the SIB1 indicates an area ID associated with an area associated with the non-anchor cell. In an eighth additional aspect, alone or in combination with one or more of the first through seventh aspects, the first SIB1 includes a second SIB1 associated with the non-anchor cell. In a ninth additional aspect, alone or in combination with one or more of the first through eighth aspects, the proxy information comprises an indication of a difference between the first SIB1 and a second SIB1 associated with the non-anchor cell.

In a tenth additional aspect, alone or in combination with one or more of the first through ninth aspects, the second SI comprises on-demand SI, process 700 includes receiving a request for the second SI. In an eleventh additional aspect, alone or in combination with one or more of the first through tenth aspects, receiving the request for the second SI comprises receiving a RACH message that indicates a request for the second SI. In a twelfth additional aspect, alone or in combination with one or more of the first through eleventh aspects, the proxy information indicates at least one of a request configuration associated with a request for on-demand SI associated with the non-anchor cell or a resource allocation associated with the request, process 700 includes receiving the request. In a thirteenth additional aspect, alone or in combination with one or more of the first through twelfth aspects, receiving the request comprises receiving a RACH message that indicates the request. In a fourteenth additional aspect, alone or in combination with one or more of the first through thirteenth aspects, process 700 includes transmitting at least one of a monitoring configuration for obtaining the second SI from the non-anchor cell or a resource allocation for obtaining the second SI from the non-anchor cell. In a fifteenth additional aspect, alone or in combination with one or more of the first through fourteenth aspects, the proxy information indicates at least one of a configuration associated with a second SIB1 associated with the non-anchor cell or a resource allocation associated with the second SIB1.

In a sixteenth additional aspect, alone or in combination with one or more of the first through fifteenth aspects, transmitting the proxy information comprises transmitting a first SIB1 associated with the anchor cell, the first SIB1 indicating the proxy information. In a seventeenth additional aspect, alone or in combination with one or more of the first through sixteenth aspects, transmitting the proxy information comprises transmitting a dedicated SI transmission including the proxy information. In an eighteenth additional aspect, alone or in combination with one or more of the first through seventeenth aspects, transmitting the proxy information comprises transmitting an RRC message including the proxy information. In a nineteenth additional aspect, alone or in combination with one or more of the first through eighteenth aspects, at least one of the first SI or the second SI indicates scheduling information associated with other SI associated with the non-anchor cell. In a twentieth additional aspect, alone or in combination with one or more of the first through nineteenth aspects, process 700 includes transmitting the other SI.

In a twenty-first additional aspect, alone or in combination with one or more of the first through twentieth aspects, the other SI comprises on-demand SI. In a twenty-second additional aspect, alone or in combination with one or more of the first through twenty-first aspects, the scheduling information indicates a cell, of the anchor cell and the non-anchor cell, on which a request for the other SI is to be transmitted. In a twenty-third additional aspect, alone or in combination with one or more of the first through twenty-second aspects, at least one of the first SI or the second SI indicates an area ID associated with the non-anchor cell. In a twenty-fourth additional aspect, alone or in combination with one or more of the first through twenty-third aspects, the first SI indicates a SIB1 associated with the non-anchor cell, and the first SI indicates whether the non-anchor cell is associated with an area ID associated with the anchor cell. In a twenty-fifth additional aspect, alone or in combination with one or more of the first through twenty-fourth aspects, process 700 includes transmitting updated SI associated with the non-anchor cell.

In a twenty-sixth additional aspect, alone or in combination with one or more of the first through twenty-fifth aspects, process 700 includes transmitting an SI update indication associated with the non-anchor cell. In a twenty-seventh additional aspect, alone or in combination with one or more of the first through twenty-sixth aspects, transmitting the SI update indication comprises transmitting a short message including the SI update indication, process 700 includes transmitting a first SIB1 associated with the anchor cell, wherein the first SIB1 indicates a change in a second SIB1 associated with the non-anchor cell. In a twenty-eighth additional aspect, alone or in combination with one or more of the first through twenty-seventh aspects, the second SI is associated with an SI-specific area ID. In a twenty-ninth additional aspect, alone or in combination with one or more of the first through twenty-eighth aspects, process 700 includes transmitting a communication comprising an indication of at least one neighbor cell ID associated with an area ID, wherein the area ID is associated with the anchor cell. In a thirtieth additional aspect, alone or in combination with one or more of the first through twenty-ninth aspects, the communication comprises at least one of a SIB1, other SI, or an RRC message.

In a thirty-first additional aspect, alone or in combination with one or more of the first through thirtieth aspects, process 700 includes transmitting a PBCH communication comprising cell information indicative of the anchor cell. In a thirty-second additional aspect, alone or in combination with one or more of the first through thirty-first aspects, the cell information indicates one or more frequency resources associated with the anchor cell. In a thirty-third additional aspect, alone or in combination with one or more of the first through thirty-second aspects, the cell information indicates a cell identifier associated with the anchor cell. In a thirty-fourth additional aspect, alone or in combination with one or more of the first through thirty-third aspects, the cell information indicates an area identifier associated with the anchor cell.

In a thirty-fifth additional aspect, alone or in combination with one or more of the first through thirty-fourth aspects, the non-anchor cell is associated with an energy saving mode of operation.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
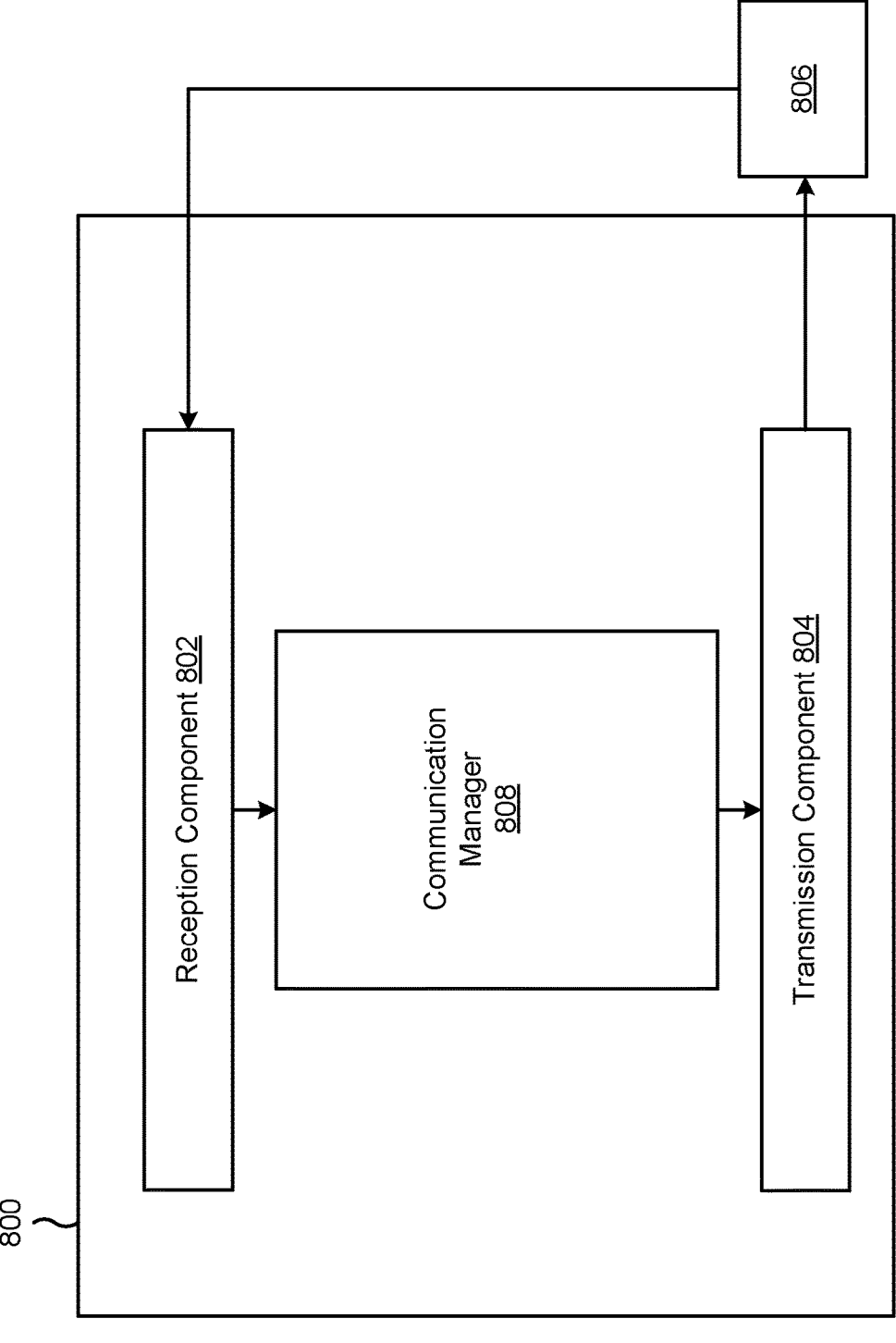
FIG. 8 is a diagram of an example apparatus for wireless communication that supports communications with non-anchor cells in accordance with the present disclosure.

FIG. 8 is a diagram of an example apparatus 800 for wireless communication that supports SI associated with cells operating in an energy saving mode in accordance with the present disclosure. The apparatus 800 may be a UE, or a UE may include the apparatus 800. In some aspects, the apparatus 800 includes a reception component 802, a transmission component 804, and a communication manager 808, which may be in communication with one another (for example, via one or more buses). As shown, the apparatus 800 may communicate with another apparatus 806 (such as a UE, a network node, or another wireless communication device) using the reception component 802 and the transmission component 804.

In some aspects, the apparatus 800 may be configured to perform one or more operations described herein in connection with FIG. 5. Additionally or alternatively, the apparatus 800 may be configured to perform one or more processes described herein, such as process 600 of FIG. 6. In some aspects, the apparatus 800 may include one or more components of the UE described above in connection with FIG. 2.

The reception component 802 may receive communications, such as reference signals, control information, and/or data communications, from the apparatus 806. The reception component 802 may provide received communications to one or more other components of the apparatus 800, such as the communication manager 140. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, and/or a memory of the UE described above in connection with FIG. 2.

The transmission component 804 may transmit communications, such as reference signals, control information, and/or data communications, to the apparatus 806. In some aspects, the communication manager 140 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, and/or a memory of the UE described above in connection with FIG. 2. In some aspects, the transmission component 804 may be co-located with the reception component 802 in a transceiver.

The communication manager 808 may receive or may cause the reception component 802 to receive, from a first network node associated with an anchor cell, first SI associated with the anchor cell and proxy information associated with obtaining second SI associated with a non-anchor cell that is associated with an energy saving mode of operation. The communication manager 808 may obtain the second SI based on the proxy information. The communication manager 808 may communicate with the non-anchor cell based on the second SI. In some aspects, the communication manager 808 may perform one or more operations described elsewhere herein as being performed by one or more components of the communication manager 140.

The communication manager 808 may include a controller/processor, and/or a memory of the UE described above in connection with FIG. 2. In some aspects, the communication manager 808 includes a set of components. Alternatively, the set of components may be separate and distinct from the communication manager 808. In some aspects, one or more components of the set of components may include or may be implemented within a controller/processor, and/or a memory, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive, from a first network node associated with an anchor cell, first SI associated with the anchor cell and proxy information associated with obtaining second SI associated with a non-anchor cell. The reception component 802 may obtain the second SI based on the proxy information. The reception component 802 and/or the transmission component 804 may communicate with the non-anchor cell based on the second SI.

The reception component 802 may receive, from the first network node, at least one of a monitoring configuration or a resource allocation, wherein receiving the on-demand SI comprises receiving the on-demand SI based on the at least one of the monitoring configuration or the resource allocation. The reception component 802 may receive the other SI. The reception component 802 may monitor, on the non-anchor cell, for an SI update indication. The reception component 802 may receive the SI update indication. The reception component 802 may obtain, from the first network node and based on receiving SI update indication, updated SI associated with the non-anchor cell. The reception component 802 may monitor, on at least one of the anchor cell or the non-anchor cell, for a paging message. The reception component 802 may monitor, on the anchor cell, for an SI update indication associated with the non-anchor cell. The reception component 802 may receive, from the first network node, a short message comprising the SI update indication. The reception component 802 may obtain, based on receiving the short message, a first SIB1 associated with the anchor cell, wherein the first SIB1 indicates a change in a second SIB1 associated with the non-anchor cell.

The reception component 802 may receive a non-anchor cell indication that indicates at least one of an SI update change associated with at least one non-anchor cell, a cell ID associated with the at least one non-anchor cell, or an area ID associated with the at least one non-anchor cell. The reception component 802 may monitor for the non-anchor cell indication. The reception component 802 may receive a communication comprising an indication of at least one neighbor cell ID associated with an area ID, wherein the area ID is associated with the anchor cell. The reception component 802 may receive a PBCH communication comprising cell information indicative of the anchor cell. The reception component 802 may monitor for the first SI based on the PBCH communication.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
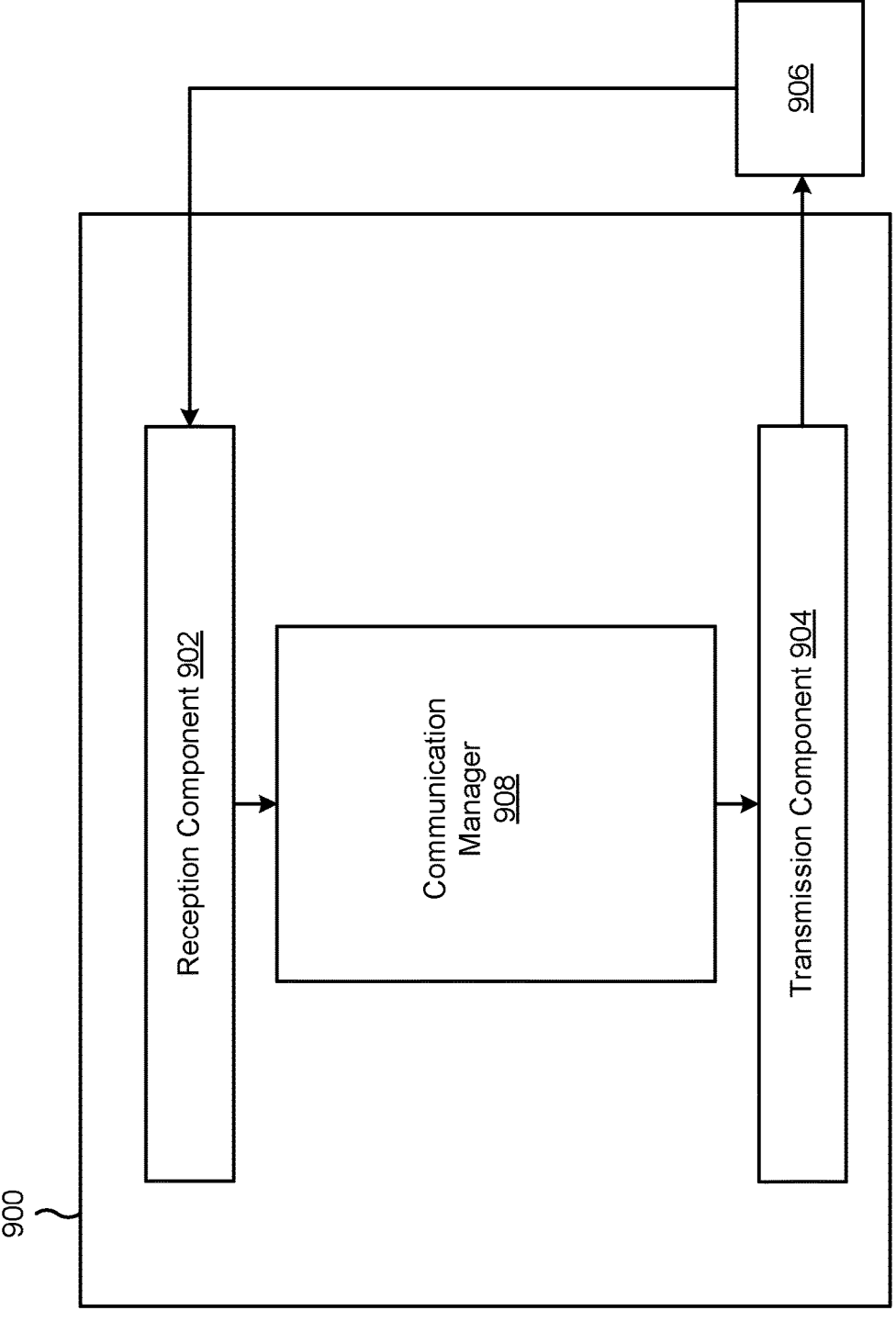
FIG. 9 is a diagram of an example apparatus for wireless communication that supports communications with non-anchor cells in accordance with the present disclosure.

FIG. 9 is a diagram of an example apparatus 900 for wireless communication that supports SI associated with cells operating in an energy saving mode in accordance with the present disclosure. The apparatus 900 may be a network node, or a network node may include the apparatus 900. In some aspects, the apparatus 900 includes a reception component 902, a transmission component 904, and a communication manager 908, which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to perform one or more operations described herein in connection with FIG. 5. Additionally or alternatively, the apparatus 900 may be configured to perform one or more processes described herein, such as process 700 of FIG. 7. In some aspects, the apparatus 900 may include one or more components of the network node described above in connection with FIG. 2.

The reception component 902 may receive communications, such as reference signals, control information, and/or data communications, from the apparatus 906. The reception component 902 may provide received communications to one or more other components of the apparatus 900, such as the communication manager 150. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, and/or a memory of the network node described above in connection with FIG. 2.

The transmission component 904 may transmit communications, such as reference signals, control information, and/or data communications, to the apparatus 906. In some aspects, the communication manager 150 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, and/or a memory of the network node described above in connection with FIG. 2. In some aspects, the transmission component 904 may be co-located with the reception component 902 in a transceiver.

The communication manager 908 may receive or may cause the reception component 902 to receive a proxy indication associated with a second network node associated with a non-anchor cell, the first network node being associated with an anchor cell. The communication manager 908 may transmit or may cause the transmission component 904 to transmit, based on receiving the proxy indication, first SI associated with the anchor cell and proxy information associated with obtaining second SI associated with the non-anchor cell. In some aspects, the communication manager 908 may perform one or more operations described elsewhere herein as being performed by one or more components of the communication manager 150.

The communication manager 908 may include a controller/processor, a memory, a scheduler, and/or a communication unit of the network node described above in connection with FIG. 2. In some aspects, the communication manager 908 includes a set of components. Alternatively, the set of components may be separate and distinct from the communication manager 908. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive a proxy indication associated with a second network node associated with a non-anchor cell that is associated with an energy saving mode of operation, the first network node being associated with an anchor cell. The transmission component 904 may transmit, based on receiving the proxy indication, first SI associated with the anchor cell and proxy information associated with obtaining second SI associated with the non-anchor cell. The transmission component 904 may transmit at least one of a monitoring configuration for obtaining the second SI from the non-anchor cell or a resource allocation for obtaining the second SI from the non-anchor cell. The transmission component 904 may transmit the other SI. The transmission component 904 may transmit updated SI associated with the non-anchor cell. The transmission component 904 may transmit an SI update indication associated with the non-anchor cell. The transmission component 904 may transmit a communication comprising an indication of at least one neighbor cell ID associated with an area ID, wherein the area ID is associated with the anchor cell. The transmission component 904 may transmit a PBCH communication comprising cell information indicative of the anchor cell.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by an apparatus at a user equipment (UE), comprising: receiving, from a first network node associated with an anchor cell, first system information (SI) associated with the anchor cell and proxy information associated with obtaining second SI associated with a non-anchor cell; obtaining the second SI based on the proxy information; and communicating with the non-anchor cell based on the second SI.

Aspect 2: The method of Aspect 1, wherein the first SI comprises a first SI block 1 (SIB1).

Aspect 3: The method of Aspect 2, wherein the first SIB1 includes scheduling information associated with a second SIB1 associated with the non-anchor cell.

Aspect 4: The method of Aspect 3, wherein the first SIB1 includes an SI type indication that indicates that the first SIB1 is to be used as the second SIB1.

Aspect 5: The method of any of Aspects 2-4, wherein the SIB1 indicates a cell identifier (ID) associated with the non-anchor cell.

Aspect 6: The method of Aspect 5, wherein the first SIB1 includes scheduling information that indicates the cell ID.

Aspect 7: The method of either of Aspects 5 or 6, wherein the first SIB1 includes an SI type indication that indicates the cell ID.

Aspect 8: The method of any of Aspects 2-7, wherein the SIB1 indicates an area identifier (ID) associated with an area associated with the non-anchor cell.

Aspect 9: The method of any of Aspects 2-8, wherein the first SIB1 includes a second SIB1 associated with the non-anchor cell.

Aspect 10: The method of any of Aspects 2-9, wherein the proxy information comprises an indication of a difference between the first SIB1 and a second SIB1 associated with the non-anchor cell.

Aspect 11: The method of Aspect 1, wherein the second SI comprises on-demand SI, the method further comprising transmitting, to the first network node, a request for the second SI.

Aspect 12: The method of Aspect 11, wherein transmitting the request for the second SI comprises transmitting a random access channel (RACH) message that indicates a request for the second SI.

Aspect 13: The method of any of Aspects 1-12, wherein the proxy information indicates at least one of a request configuration associated with a request for on-demand SI associated with the non-anchor cell or a resource allocation associated with the request, the method further comprising transmitting the request.

Aspect 14: The method of Aspect 13, wherein transmitting the request comprises transmitting a random access channel (RACH) message that indicates the request.

Aspect 15: The method of either of Aspects 13 or 14, wherein transmitting the request comprises transmitting the request to the anchor cell.

Aspect 16: The method of either of Aspects 13 or 14, wherein transmitting the request comprises transmitting the request to the non-anchor cell.

Aspect 17: The method of any of Aspects 13-16, wherein obtaining the second SI based on the proxy information comprises receiving, from the non-anchor cell and based on the request, the on-demand SI.

Aspect 18: The method of Aspect 17, further comprising receiving, from the first network node, at least one of a monitoring configuration or a resource allocation, wherein receiving the on-demand SI comprises receiving the on-demand SI based on the at least one of the monitoring configuration or the resource allocation.

Aspect 19: The method of any of Aspects 1-18, wherein the proxy information indicates at least one of a configuration associated with a second SI block 1 (SIB1) associated with the non-anchor cell or a resource allocation associated with the second SIB1, wherein obtaining the second SI comprises receiving the second SIB1 based on the at least one of the configuration associated with the second SIB1 or the resource allocation associated with the second SIB1.

Aspect 20: The method of Aspect 19, wherein receiving the proxy information comprises receiving a first SIB1 associated with the anchor cell, the first SIB1 indicating the proxy information.

Aspect 21: The method of any of Aspects 19-20, wherein receiving the proxy information comprises receiving a dedicated SI transmission from the first network node.

Aspect 22: The method of any of Aspects 19-21, wherein receiving the proxy information comprises receiving a radio resource control message from the first network node.

Aspect 23: The method of any of Aspects 1-22, wherein at least one of the first SI or the second SI indicates scheduling information associated with other SI associated with the non-anchor cell.

Aspect 24: The method of Aspect 23, further comprising receiving the other SI.

Aspect 25: The method of Aspect 24, wherein receiving the other SI comprises receiving the other SI from the first network node.

Aspect 26: The method of Aspect 24, wherein receiving the other SI comprises receiving the other SI from a second network node associated with the non-anchor cell.

Aspect 27: The method of any of Aspects 23-26, wherein the other SI comprises on-demand SI.

Aspect 28: The method of any of Aspects 23-27, wherein the first SI indicates scheduling information associated with the other SI.

Aspect 29: The method of Aspect 28, wherein the scheduling information indicates a cell, of the anchor cell and the non-anchor cell, on which a request for the other SI is to be transmitted.

Aspect 30: The method of any of Aspects 1-29, wherein at least one of the first SI or the second SI indicates an area identifier (ID) associated with the non-anchor cell, the method further comprising obtaining other SI associated with the non-anchor cell based on the area ID.

Aspect 31: The method of any of Aspects 1-30, wherein the first SI indicates a system information block 1 (SIB1) associated with the non-anchor cell, and wherein the first SI indicates whether the non-anchor cell is associated with an area identifier (ID) associated with the anchor cell.

Aspect 32: The method of any of Aspects 1-31, wherein obtaining the second SI comprises receiving, from a second network node associated with the non-anchor cell, a system information block 1 (SIB1) associated with the non-anchor cell, wherein the SIB1 indicates an additional network node associated with an additional cell associated with an area identifier (ID), wherein the area ID is associated with the second network node.

Aspect 33: The method of Aspect 32, wherein the area ID is associated with other SI associated with the non-anchor cell.

Aspect 34: The method of any of Aspects 1-33, wherein obtaining the second SI comprises receiving, from a second network node associated with the non-anchor cell, a system information block 1 (SIB1) associated with the non-anchor cell, wherein the SIB1 indicates an additional network node associated with an additional cell associated with other SI, wherein the other SI is associated with the non-anchor cell.

Aspect 35: The method of Aspect 34, wherein the other SI is common to the non-anchor cell and the additional cell.

Aspect 36: The method of any of Aspects 1-35, further comprising monitoring, on the non-anchor cell, for an SI update indication.

Aspect 37: The method of Aspect 36, further comprising: receiving the SI update indication; and obtaining, from the first network node and based on receiving SI update indication, updated SI associated with the non-anchor cell.

Aspect 38: The method of either of Aspects 36 or 37, further comprising monitoring, on at least one of the anchor cell or the non-anchor cell, for a paging message.

Aspect 39: The method of any of Aspects 1-38, further comprising monitoring, on the anchor cell, for an SI update indication associated with the non-anchor cell.

Aspect 40: The method of Aspect 39, further comprising: receiving, from the first network node, a short message comprising the SI update indication; and obtaining, based on receiving the short message, a first SI block 1 (SIB1) associated with the anchor cell, wherein the first SIB1 indicates a change in a second SIB1 associated with the non-anchor cell.

Aspect 41: The method of any of Aspects 1-40, further comprising receiving a non-anchor cell indication that indicates at least one of an SI update change associated with at least one non-anchor cell, a cell identifier (ID) associated with the at least one non-anchor cell, or an area ID associated with the at least one non-anchor cell.

Aspect 42: The method of Aspect 41, wherein receiving the non-anchor cell indication comprises receiving a short message including the non-anchor cell indication.

Aspect 43: The method of either of Aspects 41 or 42, further comprising monitoring for the non-anchor cell indication.

Aspect 44: The method of any of Aspects 41-43, wherein receiving the non-anchor cell indication comprises receiving a physical downlink shared channel (PDSCH) communication including the non-anchor cell indication.

Aspect 45: The method of any of Aspects 41-44, wherein receiving the non-anchor cell indication comprises receiving a permanent equipment identifier including the non-anchor cell indication.

Aspect 46: The method of any of Aspects 1-45, wherein the second SI is associated with an SI-specific area identifier.

Aspect 47: The method of any of Aspects 1-46, further comprising receiving a communication comprising an indication of at least one neighbor cell identifier (ID) associated with an area ID, wherein the area ID is associated with the anchor cell.

Aspect 48: The method of Aspect 47, wherein the communication comprises at least one of a system information block 1 (SIB1), other SI, or a radio resource control message.

Aspect 49: The method of any of Aspects 1-48, further comprising: receiving a physical broadcast channel (PBCH) communication comprising cell information indicative of the anchor cell; and monitoring for the first SI based on the PBCH communication.

Aspect 50: The method of Aspect 49, wherein the cell information indicates one or more frequency resources associated with the anchor cell.

Aspect 51: The method of either of Aspects 49 or 50, wherein the cell information indicates a cell identifier associated with the anchor cell.

Aspect 52: The method of any of Aspects 49-51, wherein the cell information indicates an area identifier associated with the anchor cell.

Aspect 53: A method of wireless communication performed by an apparatus at a first network node, comprising: receiving a proxy indication associated with a second network node associated with a non-anchor cell, the first network node being associated with an anchor cell; and transmitting, based on receiving the proxy indication, first system information (SI) associated with the anchor cell and proxy information associated with obtaining second SI associated with the non-anchor cell.

Aspect 54: The method of Aspect 53, wherein the first SI comprises a first SI block 1 (SIB1).

Aspect 55: The method of Aspect 54, wherein the first SIB1 includes scheduling information associated with a second SIB1 associated with the non-anchor cell.

Aspect 56: The method of Aspect 55, wherein the first SIB1 includes an SI type indication that indicates that the first SIB1 is to be used as the second SIB1.

Aspect 57: The method of any of Aspects 54-56, wherein the SIB1 indicates a cell identifier (ID) associated with the non-anchor cell.

Aspect 58: The method of Aspect 57, wherein the first SIB1 includes scheduling information that indicates the cell ID.

Aspect 59: The method of either of Aspects 57 or 58, wherein the first SIB1 includes an SI type indication that indicates the cell ID.

Aspect 60: The method of any of Aspects 54-59, wherein the SIB1 indicates an area identifier (ID) associated with an area associated with the non-anchor cell.

Aspect 61: The method of any of Aspects 54-60, wherein the first SIB1 includes a second SIB1 associated with the non-anchor cell.

Aspect 62: The method of any of Aspects 54-61, wherein the proxy information comprises an indication of a difference between the first SIB1 and a second SIB1 associated with the non-anchor cell.

Aspect 63: The method of any of Aspects 53-62, wherein the second SI comprises on-demand SI, the method further comprising receiving a request for the second SI.

Aspect 64: The method of Aspect 63, wherein receiving the request for the second SI comprises receiving a random access channel (RACH) message that indicates a request for the second SI.

Aspect 65: The method of any of Aspects 53-64, wherein the proxy information indicates at least one of a request configuration associated with a request for on-demand SI associated with the non-anchor cell or a resource allocation associated with the request, the method further comprising receiving the request.

Aspect 66: The method of Aspect 65, wherein receiving the request comprises receiving a random access channel (RACH) message that indicates the request.

Aspect 67: The method of any of Aspects 53-66, further comprising transmitting at least one of a monitoring configuration for obtaining the second SI from the non-anchor cell or a resource allocation for obtaining the second SI from the non-anchor cell.

Aspect 68: The method of any of Aspects 53-67, wherein the proxy information indicates at least one of a configuration associated with a second SI block 1 (SIB1) associated with the non-anchor cell or a resource allocation associated with the second SIB1.

Aspect 69: The method of Aspect 68, wherein transmitting the proxy information comprises transmitting a first SIB1 associated with the anchor cell, the first SIB1 indicating the proxy information.

Aspect 70: The method of any of Aspects 53-69, wherein transmitting the proxy information comprises transmitting a dedicated SI transmission including the proxy information.

Aspect 71: The method of any of Aspects 53-69, wherein transmitting the proxy information comprises transmitting a radio resource control message including the proxy information.

Aspect 72: The method of any of Aspects 53-71, wherein at least one of the first SI or the second SI indicates scheduling information associated with other SI associated with the non-anchor cell.

Aspect 73: The method of Aspect 72, further comprising transmitting the other SI.

Aspect 74: The method of either of Aspects 72 or 73, wherein the other SI comprises on-demand SI.

Aspect 75: The method of any of Aspects 72-74, wherein the scheduling information indicates a cell, of the anchor cell and the non-anchor cell, on which a request for the other SI is to be transmitted.

Aspect 76: The method of any of Aspects 53-75, wherein at least one of the first SI or the second SI indicates an area identifier (ID) associated with the non-anchor cell.

Aspect 77: The method of any of Aspects 53-76, wherein the first SI indicates a system information block 1 (SIB1) associated with the non-anchor cell, and wherein the first SI indicates whether the non-anchor cell is associated with an area identifier (ID) associated with the anchor cell.

Aspect 78: The method of any of Aspects 53-77, further comprising transmitting updated SI associated with the non-anchor cell.

Aspect 79: The method of any of Aspects 53-78, further comprising transmitting an SI update indication associated with the non-anchor cell.

Aspect 80: The method of Aspect 79, wherein transmitting the SI update indication comprises transmitting a short message including the SI update indication, the method further comprising transmitting a first SI block 1 (SIB1) associated with the anchor cell, wherein the first SIB1 indicates a change in a second SIB1 associated with the non-anchor cell.

Aspect 81: The method of any of Aspects 53-80, wherein the second SI is associated with an SI-specific area identifier.

Aspect 82: The method of any of Aspects 53-81, further comprising transmitting a communication comprising an indication of at least one neighbor cell identifier (ID) associated with an area ID, wherein the area ID is associated with the anchor cell.

Aspect 83: The method of Aspect 82, wherein the communication comprises at least one of a system information block 1 (SIB1), other SI, or a radio resource control message.

Aspect 84: The method of any of Aspects 53-83, further comprising transmitting a physical broadcast channel (PBCH) communication comprising cell information indicative of the anchor cell.

Aspect 85: The method of Aspect 84, wherein the cell information indicates one or more frequency resources associated with the anchor cell.

Aspect 86: The method of either of Aspects 84 or 85, wherein the cell information indicates a cell identifier associated with the anchor cell.

Aspect 87: The method of any of Aspects 84-86, wherein the cell information indicates an area identifier associated with the anchor cell.

Aspect 88: The method of any of Aspects 1-52 and/or the method of any of aspects 53-87, wherein the non-anchor cell is associated with an energy saving mode of operation.

Aspect 89: An apparatus for wireless communication at a device, comprising a processor; memory coupled with the processor; and instructions stored in the memory and executable by the processor to cause the apparatus to perform the method of one or more of Aspects 1-52 and 88.

Aspect 90: A device for wireless communication, comprising a memory and one or more processors coupled to the memory, the one or more processors configured to perform the method of one or more of Aspects 1-52 and 88.

Aspect 91: An apparatus for wireless communication, comprising at least one means for performing the method of one or more of Aspects 1-52 and 88.

Aspect 92: A non-transitory computer-readable medium storing code for wireless communication, the code comprising instructions executable by a processor to perform the method of one or more of Aspects 1-52 and 88.

Aspect 93: A non-transitory computer-readable medium storing a set of instructions for wireless communication, the set of instructions comprising one or more instructions that, when executed by one or more processors of a device, cause the device to perform the method of one or more of Aspects 1-52 and 88.

Aspect 94: An apparatus for wireless communication at a device, comprising a processor; memory coupled with the processor; and instructions stored in the memory and executable by the processor to cause the apparatus to perform the method of one or more of Aspects 53-88.

Aspect 95: A device for wireless communication, comprising a memory and one or more processors coupled to the memory, the one or more processors configured to perform the method of one or more of Aspects 53-88.

Aspect 96: An apparatus for wireless communication, comprising at least one means for performing the method of one or more of Aspects 53-88.

Aspect 97: A non-transitory computer-readable medium storing code for wireless communication, the code comprising instructions executable by a processor to perform the method of one or more of Aspects 53-88.

Aspect 98: A non-transitory computer-readable medium storing a set of instructions for wireless communication, the set of instructions comprising one or more instructions that, when executed by one or more processors of a device, cause the device to perform the method of one or more of Aspects 53-88.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   a processing system that includes processor circuitry and memory circuitry coupled with the processor circuitry, the processing system configured to cause the UE to:
      receive, from a first network node associated with an anchor cell, first system information (SI) associated with the anchor cell and proxy information associated with obtaining second SI associated with a non-anchor cell, wherein the proxy information indicates at least one of:
         a request configuration associated with a request for on-demand SI associated with the non-anchor cell,
         a resource allocation associated with the request,
         a configuration associated with an SI block 1 (SIB1) associated with the non-anchor cell, or
         a resource allocation associated with the SIB1;
      obtain the second SI based on the proxy information; and
      communicate with the non-anchor cell based on the second SI.

2. The UE of claim 1, wherein the first SI comprises a first SIB1.

3. The UE of claim 2, wherein the first SIB1 includes scheduling information associated with the SIB1 associated with the non-anchor cell.

4. The UE of claim 2, wherein the first SIB1 indicates a cell identifier (ID) associated with the non-anchor cell.

5. The UE of claim 2, wherein the first SIB1 indicates an area identifier (ID) associated with an area associated with the non-anchor cell.

6. The UE of claim 2, wherein the first SIB1 includes the SIB1 associated with the non-anchor cell.

7. The UE of claim 2, wherein the proxy information comprises an indication of a difference between the first SIB1 and the SIB1 associated with the non-anchor cell.

8. The UE of claim 1, wherein the second SI comprises on-demand SI, and wherein the processing system is further configured to cause the UE to transmit, to the first network node, a request for the second SI.

9. The UE of claim 8, wherein the processing system, to cause the UE to transmit the request for the second SI, is configured to cause the UE to transmit a random access channel (RACH) message that indicates a request for the second SI.

10. The UE of claim 1, wherein the processing system is further configured to cause the UE to transmit the request.

11. The UE of claim 10, wherein the processing system, to cause the UE to transmit the request, is configured to cause the UE to transmit a random access channel (RACH) message that indicates the request.

12. The UE of claim 10, wherein the processing system, to cause the UE to obtain the second SI based on the proxy information, is configured to cause the UE to receive, from the non-anchor cell and based on the request, the on-demand SI.

13. The UE of claim 1, wherein the processing system, to cause the UE to obtain the second SI, is configured to cause the UE to receive the SIB1 based on the at least one of the configuration associated with the SIB1 or the resource allocation associated with the SIB1.

14. The UE of claim 13, wherein the processing system, to cause the UE to receive the proxy information, is configured to cause the UE to receive a first SIB1 associated with the anchor cell, the first SIB1 indicating the proxy information, a dedicated SI transmission from the first network node, or a radio resource control message from the first network node.

15. The UE of claim 1, wherein at least one of the first SI or the second SI indicates scheduling information associated with other SI associated with the non-anchor cell.

16. The UE of claim 15, wherein the processing system is further configured to cause the UE to receive the other SI from the first network node or from a second network node associated with the non-anchor cell.

17. The UE of claim 1, wherein at least one of the first SI or the second SI indicates an area identifier (ID) associated with the non-anchor cell, and wherein processing system is further configured to cause the UE to obtain other SI associated with the non-anchor cell based on the area ID.

18. The UE of claim 1, wherein the first SI indicates the SIB1 associated with the non-anchor cell, and wherein the first SI indicates whether the non-anchor cell is associated with an area identifier (ID) associated with the anchor cell.

19. The UE of claim 1, wherein the processing system, to cause the UE to obtain the second SI, is configured to cause the UE to receive, from a second network node associated with the non-anchor cell, the SIB1 associated with the non-anchor cell, wherein the SIB1 indicates an additional network node associated with an additional cell associated with an area identifier (ID), wherein the area ID is associated with the second network node.

20. The UE of claim 1, wherein the processing system, to cause the UE to obtain the second SI, is configured to cause the UE to receive, from a second network node associated with the non-anchor cell, the SIB1 associated with the non-anchor cell, wherein the SIB1 indicates an additional network node associated with an additional cell associated with other SI, wherein the other SI is associated with the non-anchor cell.

21. The UE of claim 1, wherein the processing system is further configured to cause the UE to monitor, on the non-anchor cell, for an SI update indication.

22. The UE of claim 1, wherein the processing system is further configured to cause the UE to monitor, on the anchor cell, for an SI update indication associated with the non-anchor cell.

23. The UE of claim 1, wherein the processing system is further configured to cause the UE to receive a non-anchor cell indication that indicates at least one of an SI update change associated with at least one non-anchor cell, a cell identifier (ID) associated with the at least one non-anchor cell, or an area ID associated with the at least one non-anchor cell.

24. The UE of claim 1, wherein the second SI is associated with an SI-specific area identifier.

25. The UE of claim 1, wherein the processing system is further configured to cause the UE to receive a communication comprising an indication of at least one neighbor cell identifier (ID) associated with an area ID, wherein the area ID is associated with the anchor cell.

26. The UE of claim 1, wherein the processing system is further configured to cause the UE to:

receive a physical broadcast channel (PBCH) communication comprising cell information indicative of the anchor cell; and monitor for the first SI based on the PBCH communication.

27. A first network node for wireless communication, comprising:

a processing system that includes processor circuitry and memory circuitry coupled with the processor circuitry, the processing system configured to cause the first network node to:

receive a proxy indication associated with a second network node associated with a non-anchor cell, the first network node being associated with an anchor cell; and transmit, based on receiving the proxy indication, first system information (SI) associated with the anchor cell and proxy information associated with obtaining second SI associated with the non-anchor cell, wherein the proxy information indicates at least one of:

a request configuration associated with a request for on-demand SI associated with the non-anchor cell, a resource allocation associated with the request, a configuration associated with an SI block 1 (SIB1) associated with the non-anchor cell, or a resource allocation associated with the SIB1.

28. The first network node of claim 27, wherein the first SI comprises a first SIB1.

29. A method of wireless communication performed by an apparatus at a user equipment (UE), comprising:

receiving, from a first network node associated with an anchor cell, first system information (SI) associated with the anchor cell and proxy information associated with obtaining second SI associated with a non-anchor cell, wherein the proxy information indicates at least one of:

a request configuration associated with a request for on-demand SI associated with the non-anchor cell, a resource allocation associated with the request, a configuration associated with an SI block 1 (SIB1) associated with the non-anchor cell, or a resource allocation associated with the SIB1;

obtaining the second SI based on the proxy information; and communicating with the non-anchor cell based on the second SI.

30. The method of claim 29, wherein the first SI comprises a first SIB1.

* * * * *